United States Patent [19]
Thuez et al.

[11] Patent Number: 5,007,251
[45] Date of Patent: Apr. 16, 1991

[54] INSTALLATION FOR AIR-CONDITIONING BY ABSORPTION

[75] Inventors: Jean-Luc Thuez, St-Germain-en-Laye; Robert Dehausse, Joinville, both of France

[73] Assignee: A.R.M.I.N.E.S., Paris, France

[21] Appl. No.: 392,953

[22] PCT Filed: Dec. 7, 1988

[86] PCT No.: PCT/FR88/00598
§ 371 Date: Aug. 2, 1989
§ 102(e) Date: Aug. 2, 1989

[87] PCT Pub. No.: WO89/05427
PCT Pub. Date: Jun. 15, 1989

[30] Foreign Application Priority Data

Dec. 7, 1987 [FR] France .................. 87 16981

[51] Int. Cl.⁵ .................................. F25B 15/00
[52] U.S. Cl. .................................... 62/476
[58] Field of Search ........................ 62/476

[56] References Cited

U.S. PATENT DOCUMENTS

| | | |
|---|---|---|
| 2,559,217 | 7/1951 | Kehoe . |
| 2,729,952 | 1/1956 | Whitlow . |
| 3,605,436 | 9/1971 | Gammill, Jr. ............ 62/476 |
| 3,659,431 | 5/1972 | Iwasawa et al. ......... 62/476 |
| 3,740,966 | 6/1973 | Pravda ................... 62/476 |
| 3,828,575 | 8/1974 | Malcosky et al. ....... 62/476 |
| 3,964,273 | 6/1976 | Merrick .................. 62/476 |
| 4,424,688 | 1/1984 | Wilkinson ............... 62/476 |
| 4,442,677 | 4/1984 | Kauffman ............... 62/476 X |
| 4,656,839 | 4/1987 | Cross et al. ............ 62/476 |
| 4,841,744 | 6/1989 | Kurosawa et al. ...... 62/476 X |

FOREIGN PATENT DOCUMENTS

| | | |
|---|---|---|
| 0119776 | 9/1984 | European Pat. Off. . |
| 2807990 | 8/1979 | Fed. Rep. of Germany . |
| 3233649 | 3/1983 | Fed. Rep. of Germany . |
| 1547138 | 11/1968 | France . |

Primary Examiner—Lloyd L. King
Attorney, Agent, or Firm—McAulay, Fisher, Nissen, Goldberg & Kiel

[57] ABSTRACT

Installation for air-conditioning by absorption, having a high-pressure enclosure 1 containing a heater heated to high temperature, in which a refrigerating fluid is driven by vaporation to form a gaseous refrigerant, and a condenser on which the refrigerating fluid is liquified; a low-pressure enclosure 2 containing an evaporator on which the liquified refrigerant is vaporized for producing a desired cold and an absorber on which the gaseous refrigerant is re-absorbed in the depleted solution before being returned to the heater via a pump; the high-pressure enclosure 1 and the low-pressure enclosure 2 each having a generally toric-shaped casing with a common vertical axis, said high-pressure enclosure 1 being located above said low-pressure enclosure 2; a high-pressure and a low-pressure central free space in each enclosure, the high-pressure central free space in the high-pressure enclosure is de-limited by central cylindrical wall 1a, and the low-pressure central free space in the low-pressure enclosure is de-limited by central cylindrical wall 1b; and a cooler 16-18 arranged in the central free space de-limited by the cylindrical inner walls 1b, 2b of the two casings of the two enclosures, 1, 2, for ensuring partial or total exchange of heat energy produced by condensation, absorption and possible evaporation.

20 Claims, 3 Drawing Sheets

Fig. 1

INSTALLATION FOR AIR-CONDITIONING BY ABSORPTION

The present invention relates to an installation for air-conditioning by absorption designed to use more particularly either the heat rejected by an engine or like apparatus, or solar energy, and adapted to be used either in fixed form or embarked on a vehicle.

An installation for air-conditioning by absorption principally comprises a heater heated to high temperature, from any source of heat, in which a refrigerating fluid is driven by vaporization, a condenser in which the refrigerating fluid is liquefied, an evaporator in which the liquid refrigerant is vaporized to produce the desired cold and an absorber in which the gaseous refrigerant is re-absorbed in the depleted solution before being returned to the heater via a pump. The heater and the condenser of such an installation function at a high pressure which is the pressure of condensation of the refrigerating fluid, whilst the evaporator and the absorber function at a low pressure which is the pressure of evaporation of the refrigerating fluid. The high- and low-pressure circuits are connected by one or more pumps and pressure reducing valves which may be atomizers.

Installations for air-conditioning by absorption of this type are already known, as described for example in Patent FR-A 1 325 938.

The present invention relates to improvements to such an installation for the purpose of rendering it compact, which facilitates its use on board a vehicle, and of increasing its output.

To that end, this installation for air-conditioning by absorption comprising a high-pressure enclosure containing a heater heated to high temperature, in which a refrigerating fluid is driven by vaporization, and a condenser on which the refrigerating fluid is liquefied, and a low-pressure enclosure containing an evaporator on which the liquid refrigerant is vaporized to produce the desired cold and an absorber on which the gaseous refrigerant is re-absorbed in the depleted solution before being returned to the heater via a pump, is characterized in that the two high-pressure and low-pressure enclosures each have a generally toric-shaped casing with a common vertical axis, the high-pressure enclosure being located above the low-pressure enclosure and cooling means are arranged in the central free space delimited by the cylindrical inner walls of the two casings of the two enclosures, in order to ensure the partial or total exchange of the heat energy produced by condensation, absorption and possibly evaporation.

Various embodiments of the present invention will be described hereinafter by way of non-limiting examples, with reference to the accompanying drawings, in which.

Figure 1:
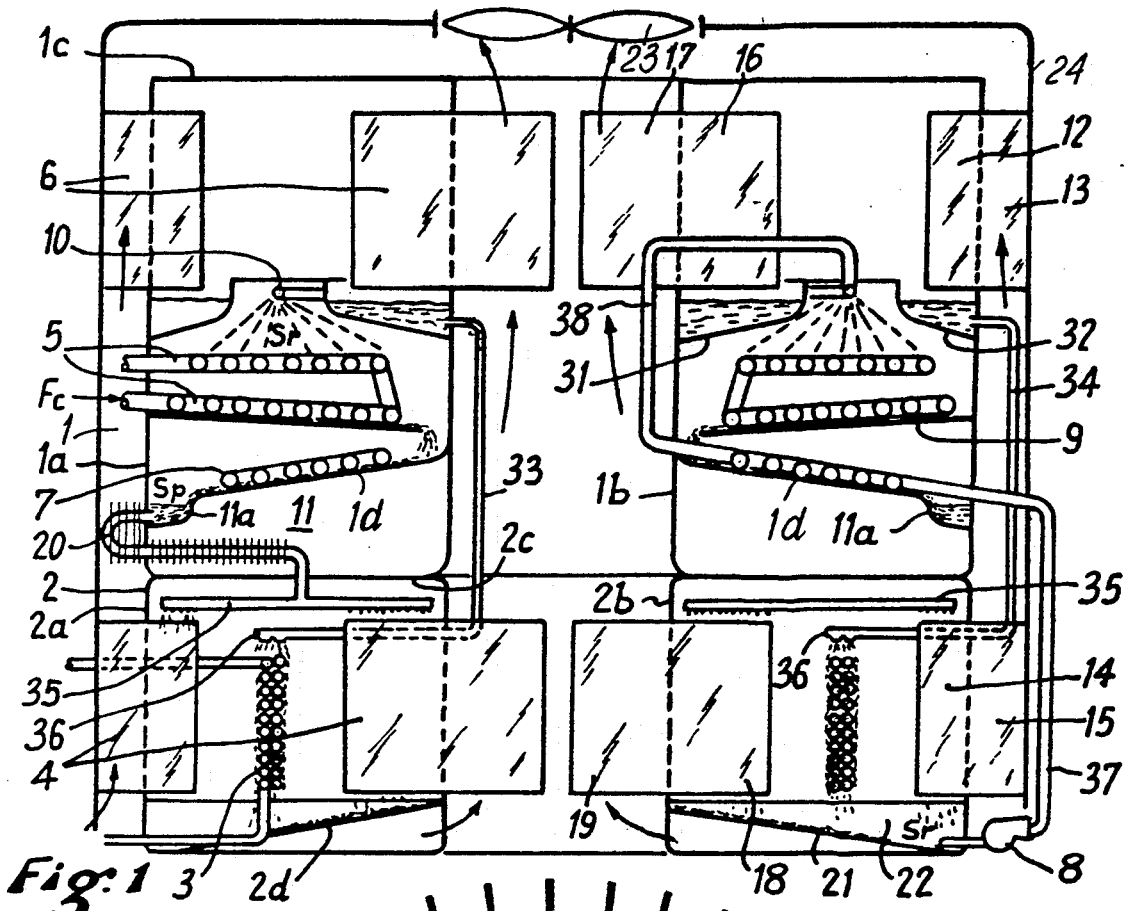
FIG. 1 is a view in axial and vertical section of an intallation for air-conditioning by absorption according to the invention.
Figure 2:
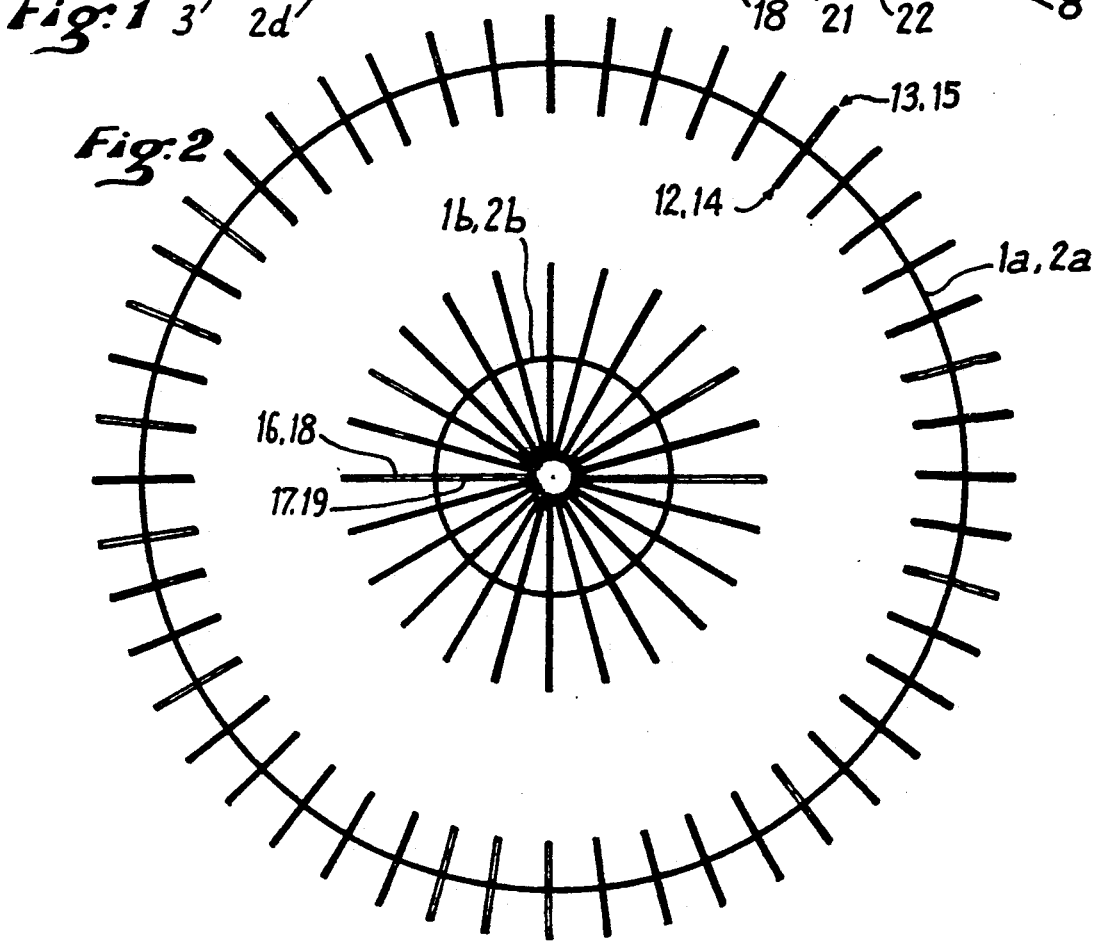
FIG. 2 is a plan view of the air-conditioning installation of FIG. 1.

If reference is made to FIGS. 1 and 2, it is seen that these Figures represent an installation for air-conditioning by absorption, comprising two superposed assemblies, namely an upper enclosure 1 at high pressure Pc and a lower enclosure 2 at low pressure Po. These two enclosures and 2 each have a casing of generally toric shape with a common vertical axis. The casings of the two enclosures 1, 2 comprise respective outer cylindrical walls 1a, 2a and respective inner cylindrical walls 1b, 2b.

The upper high-pressure enclosure 1 also comprises an upper annular horizontal wall 1c and a lower annular wall constituting the inner truncated bottom 1d, converging upwardly, delimiting the active part proper of the enclosure 1. The four walls 1a, 1b, 1c, 1d enclose a heater 5, a condenser 6 and, at the bottom, an exchanger of solutions 7. The upper, high-pressure enclosure rests on the lower enclosure 2 via vertical struts 11, constituting downwardly extending fins or radial plates, and ensuring horizontal stability of the upper enclosure 1.

In the same way, the lower low-pressure enclosure 2 comprises an upper annular horizontal wall 2c and a truncated bottom 2d converging upwardly. The four walls 2a, 2b, 2c, 2d of the lower low-pressure enclosure 2 contain an evaporator 3 and an absorber 4 4, including heat exchanger fins 14, 15, 18 and 19. Furthermore, the truncated bottom 2d bears radial cooling fins of which parts 21 extend outwardly and parts 22 extend inwardly, through the bottom 2d.

In this way, the toric casings of the two enclosures 1, 2, at least, concerning the upper enclosure 1, its active part, have a generatrix section in the form of a rectangular trapezium whose lower side is inclined downwardly, moving away from the common vertical axis, since their bottoms 1d and 2d have an upwardly converging truncated shape.

In the embodiment of the invention shown in FIGS. 1 and 2, the outer (1a) and inner (1b) cylindrical walls of the upper high-pressure enclosure 1 respectively bear radial cooling fins 12, 13 and 16, 17. In the same way, the outer (2a) and inner (2b) cylindrical walls of the lower low-pressure enclosure 2 respectively bear radial cooling fins 14, 15 and 18, 19 forming part of absorber 4. All these fins 12 to 19 are distributed regularly about the common vertical axis of the two enclosures 1, 2.

All the cooling fins 12 to 19 extend vertically, partly inside the two enclosures 1, 2 and partly outside them.

The two high-pressure (1) and low-pressure (2) enclosures are superposed so that their inner cylindrical walls 1b, 2b, of the same diameter, are also superposed and form a passage for the cooling air flowing naturally upwardly by convection, along the outer parts 19 and 17 of the fins borne by the inner walls 1b and 2b, as indicated by the arrows. The cooling air also flows in the channels delimited by the lower radial fins 21 and also along the outer parts 15 and 13 of the radial fins borne by the outer walls 1a and 2a.

As indicated hereinabove, the upper high-pressure enclosure 1 contains the heater 5 which is constituted by a coil supplied by a hot heat-transfer fluid Fc which may be the cooling water of an engine or a liquid reject of suitable temperature or a heat-transfer medium which will seek its heat for example on the exhaust of an engine, on a gaseous reject or on a solar collector. The heater 5 is sprayed on the outside by the jets of an annular spray bar 10 located substantially halfway up in the enclosure 1, above the coil constituting the heater 5. This coil is in part welded to a truncated annular plate 9, converging downwardly, over which trickles, in the direction of the axis, the solution which is depleted by boiling. The condenser 6 which constitutes the upper part of the high-pressure enclosure 1, is formed by the inner parts 12 and 16 of the radial fins on which are condensed the refrigerant vapours emitted by the heater 5.

The refrigerant vapour which is condensed in the upper condenser 6, along the fins 12, 16, is collected in an inner annular trough 31, fast with the inner wall 1b, and in an outer annular trough 32, fast with the outer wall 1a, these troughs 31, 32 collecting the refrigerant condensate being disposed respectively beneath the fins 16 of the inner wall 1b and the fins 12 of the outer wall 1a. These troughs 31, 32 are connected to conduits 33, 34 extending downwardly and collecting the condensed refrigerant.

On the inner bottom 1d, of truncated shape with inclination opposite that of the plate 9 of the heater, i.e. converging upwardly, is welded the coil of the solution exchanger 7. The solution poor in refrigerant Sp dropping from the edge of the plate 9, near the inner wall 1b, trickles over the bottom 1d/coil 7 assembly and collects in an annular gutter 1a adjacent the outer wall 11a at the lowermost point of the enclosure 1.

The solution poor in refrigerant Sp which is collected in the gutter 11a, in the lower part of the high-pressure enclosure 1, is transmitted by gravity or, according to a variant, with the aid of a pump via finned tubes 20 connected to the gutter 11a, which extend outside the enclosure 1 and lead, in the enclosure 2, to horizontal sprays 35 disposed in the upper part of the low-pressure enclosure 2. Furthermore, the conduits 33, 34 recovering the condensed refrigerant are connected, in the low-pressure lower enclosure 2, to sprays 36 disposed above the evaporator 3, the latter being made in the form of a coil disposed coaxially in the lower low-pressure enclosure 2. A conduit 37 on which is connected a circulation pump 8, connects the bottom 2d of the low-pressure enclosure 2, where is collected the regenerated solution of the absorber 4, to the solution exchanger 7. The reheated solution leaves this exchanger via a tube 38 to supply the annular conduit of the sprays 10.

The installation according to the invention, constituted by the superposed enclosures 1, 2, may advantageously be housed inside a hood 24 open in its lower part to allow the admission of cooling air. The upper horizontal wall of the hood 24 is pierced with a central opening in which is housed a fan 23 of vertical axis, in order to increase the air flowrate through the installation.

In the variant embodiment shown in FIG. 3, the installation comprises an additional cooling unit constituted by a radiator 26 disposed in the upper end part of the conduit delimited by the inner wall 1b of the upper high-pressure enclosure 1, a ventilator 27 disposed in this same conduit below the radiator 26 and a pipe 25 constituting a closed circuit for the circulation of a heat-transfer fluid moved by a pump 39 connected to this pipe. This pipe 25 is connected in series, or, in a variant, in parallel, to a coil 40 of an exchanger housed in the lower low-pressure enclosure 2 to constitute a part of the absorber 4, and to another coil 41 of another exchanger housed in the high-pressure enclosure and constituting a part of the condenser 6. With such an arrangement, part of the power of the condensation is evacuated by the fins 12, 13 borne by the outer wall 1a of the high-pressure enclosure 1 and the other part of this power is evacuated by the other coil 41 of the other exchanger towards the additional cooling unit including pipe 25, radiator 26, ventilator 27, and pump 39 which are in combination with the two coils 40, 41 (so as to constitute the additional cooling unit). Similarly, a part of the power of absorption is evacuated by the fins 14, 15 borne by the outer wall 2a of the low-pressure enclosure 2 and the other part is evacuated by the exchanger 40 towards the cooling unit 25, 26, 27, 39.

Figure 3:
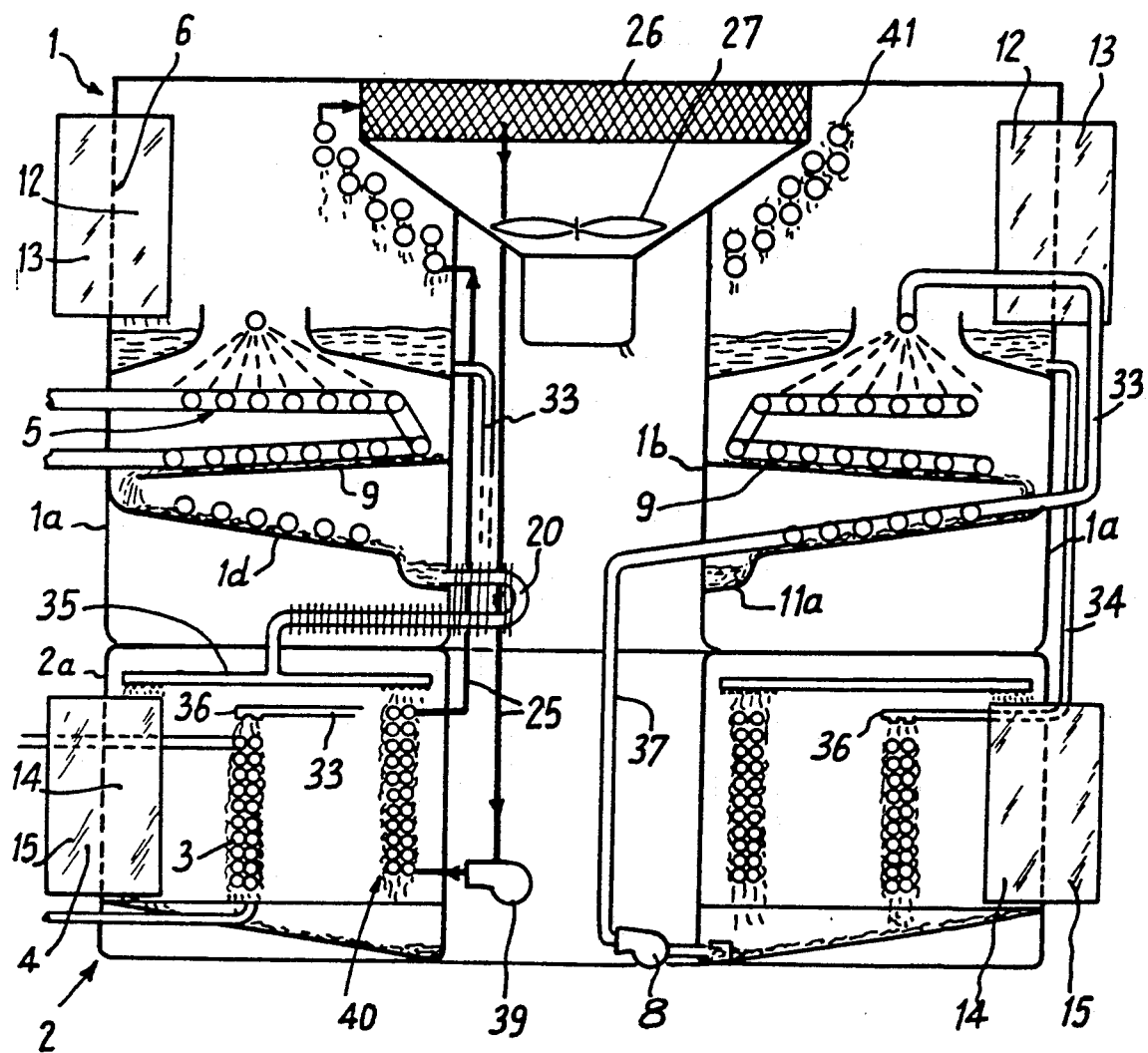
FIG. 3 is a view in axial and vertical section of another variant embodiment of the installation for air-conditioning by absorption in the case of it being embarked on a vehicle.

In the embodiment of the invention shown in FIG. 3, the inclinations of the plates 9 and 1d are reversed with respect to those indicated with regard to FIG. 1. In other words, the plate 9 has an upwardly converging truncated shape and the bottom 1d has a downwardly converging truncated shape so that the gutter 11a is now adjacent the inner wall 1b.

Figure 4:
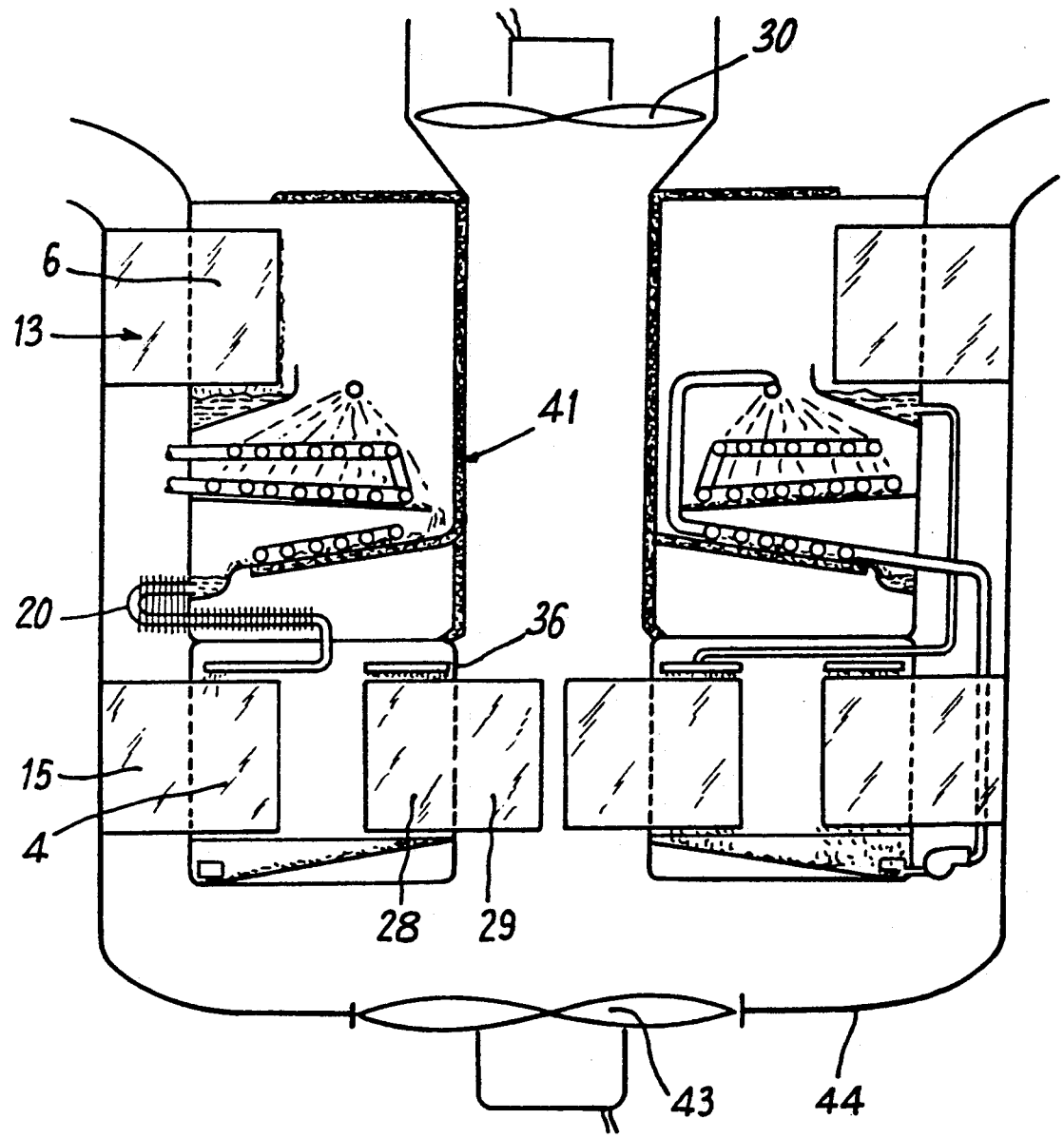
FIG. 4 is a view in axial and vertical section of another variant embodiment of the installation for air-conditioning by absorption according to the invention.

In the variant embodiment of the invention shown in FIG. 4, the cold produced by the apparatus is transmitted directly to an air stream passing in the central conduit of the enclosures 1 and 2. The evaporator is constituted by radial fins 28, 29 whose parts 28 inside the enclosure 2 receive the trickling of the refrigerant issuing from a spray 36 and whose outer parts 29 ensure cooling of the air stream which is accelerated by a ventilator 30 placed in the axis and in the upper part of the central conduit, the latter having been provided with a heat insulation 41 on the walls located above the fins 29. The heat of fins 15 of the absorber 4, that of the finned tubes 20 of the return of solution poor in refrigerant Sp and that of the fins 13 of the condenser 6 is evacuated by a peripheral air stream produced by a lower ventilator 43 and an outer hood 44. The rest of the installation takes up the embodiments of FIGS. 1, 2 and 3.

Although in the foregoing description the various embodiments of the installation according to the invention comprise fins 12, 13, 14, 15, 16, 17, 18, 19, 28, 29 to ensure partial or total exchange of the heat energy produced by condensation and absorption, and, for the variant of FIG. 4, by the evaporator, it goes without saying that these fins may be replaced by any other member able to perform the same function and, to that end, heat pipes of similar shapes may be used.

We claim:

1. Installation for air-conditioning by absorption, comprising:

a high-pressure enclosure 1 containing a heater heated to high temperature, in which a refrigerating fluid is driven by evaporation to form a gaseous refrigerant, and a condenser on which the refrigerating fluid is liquidified; and a low-pressure enclosure 2 containing an evaporator on which the liquified refrigerant is vaporized for producing a desired cold and an absorber on which the gaseous refrigerant is reabsorbed in the depleted solution before being returned to the heater via a pump;

said high-pressure enclosure 1 and said low-pressure enclosure 2 each having a generally toric-shaped casing with a common vertical axis, said high-pressure enclosure 1 being located above and superimposed on said low-pressure enclosure 2;

means enclosing a high-pressure and a low-pressure central free space in each said enclosure, said high-pressure central free space in said high-pressure enclosure is de-limited by central cylindrical wall 1a and being coaxial with said common vertical axis, and said low-pressure central free space in said low-pressure enclosure is de-limited by central cylindrical wall 1b and coaxial with said vertical axis; and cooling means 16–18 positioned in said central free space delimited by said cylindrical inner walls 1b of said two casings of said two enclosures 1, 2, for ensuring partial or total exchange of heat energy produced by condensation, absorption and possible evaporation.

2. Installation according to claim 1, wherein said toric-shaped casings each have a generatrix section in the form of a rectangular trapezium, with a horizontal upper side and an inclined lower side, i.e., their bottoms 1d, 2d have a truncated shape and said toric-shaped casings being superimposed one above the other.

3. Installation according to claim 1, including a heater 5 constituted in part by a coil wedged to a truncated annular plate 9, and receiving jets from sprays 10 being located above said heater 5.

4. Installation according to claim 3, including a solution exchanger 7 having a coil, placed below said heater 5 in said upper high-pressure enclosure 1, welded to a truncated annular bottom plate 1d with inclination opposite to said truncated annular plate 9 of the heater 5, and a solution poor in refrigerant (Sp) trickling over the coil of said solution exchanger 7 and the truncated plate 9.

5. Installation according to claim 1, wherein each of said enclosures 1, 2 comprises radial fins 12–19 on its cylindrical walls 1a, 1b, 2a, 2b constituting the outside and inside of said toric-shaped casing, said radial fins passing through said walls and extending both inwardly (12, 14, 16, 18) into said low-pressure and said high-pressure free space and outwardly (13, 15, 17, 19) of the enclosures 1, 2, the outer parts of the fins being cooled in free convection by the ambient air while the inner parts of the fins constitute, in the low-pressure enclosure 2, the trickling surfaces of the absorber 14, 18 and, in the high-pressure enclosure 1, the condensation surfaces 12, 16.

6. Installation according to claim 6, comprising a cooler of the solution poor in refrigerant (Sp), formed by finned tubes 20 placed outside said two enclosures 1, 2, and a cooler of a rich solution (Sr) formed by radial fins 21, 22 traversing the bottom 2d of said low-pressure enclosure 2.

7. Installation according to claim 1, comprising a ventilator 23 and an outer hood 24 housing each of said enclosures 1, 2 for forcing the passage of the air between the outer parts of the fins, in order to cool them by the ambient air.

8. Installation according to claim 1, comprising a circuit 25 for circulation of a heat-transfer fluid cooling in a radiator 26 placed at the center of the installation in the air stream of a ventilator 27 coaxial with said common vertical axis, in order to partially evacuate the heat energy of the condenser and of the absorber.

9. Installation according to claim 1, including an evaporator constituted by radial fins 28, 29, the outer parts of said radial fins 28, 29 extending into said low-pressure free space passing through the inner cylindrical wall 2b of the low-pressure enclosure 2, in order to directly cool the flow of air-conditioning air, said last-mentioned fins 28, 29 receiving, on their inner parts 28, the trickling of the refrigerating fluid, while their outer parts 29 are traversed by the air flow to be cooled, which is accelerated by a central ventilator 30.

10. Installation according to claim 1, comprising, heat conducting plates in the shape of fins.

11. Installation according to claim 2, including a heater 5 constituted in part by a coil wedged to a truncated annular plate 9, said heater receiving jets from sprays 10, and said jets being located above said heater 5.

12. Installation according to claim 11, wherein each of said enclosures 1, 2 comprises radial fins 12–19 on its cylindrical walls 1a, 1b, 2a, 2b constituting the outside and inside of said toric-shaped casing, said radial fins passing through said walls and extending both inwardly (12, 14, 16, 18) and outwardly (13, 15, 17, 19) of the enclosures 1, 2 into said low-pressure free space and said high-pressure free space of said enclosures 1, 2, the outer parts of the fins being cooled in free convection by the ambient air while the inner parts of the fins constitute, in the low-pressure enclosure 2, the trickling surfaces of the absorber 14, 18 and, in the high-pressure enclosure 1, the condensation surfaces 12, 16.

13. Installation according to claim 12, comprising a cooler of the solution poor in refrigerant (Sp), formed by finned tubes 20 placed outside said two enclosures 1, 2, and a cooler of a rich solution (Sr) formed by radial fins 21, 22 traversing the bottom 2d of said low-pressure enclosure 2.

14. Installation according to claim 13, comprising a ventilator 23 and an outer hood 24 for forcing the passage of the air between the outer parts of the fins, in order to cool them by the ambient air, said outer hood housing each of said enclosures 1, 2 and being open in its lower part to allow the admission of the ambient air.

15. Installation according to claim 14, comprising a circuit 25 for circulation of a heat-transfer fluid cooling in a radiator 26 placed at the center of the installation in the air stream of a ventilator 27 coaxial with said common vertical axis, in order to partially evacuate the heat energy of the condenser and of the absorber.

16. Installation according to claim 15, including an evaporator constituted by radial fins 28, 29 passing through the inner cylindrical wall 2b of the low-pressure enclosure 2, in order to directly cool the flow of air-conditioning air, said last-mentioned fins 28, 29 receiving, on their inner parts 28, the trickling of the refrigerating fluid, while their outer parts 29 are traversed by the air flow to be cooled, which is accelerated by a central ventilator 30, said outer parts 29 extending into said low-pressure central free space.

17. Installation according to claim 16, comprising, heat conducting plates for use as trickling surfaces, condensation surfaces and free convection surfaces.

18. Installation according to claim 2, wherein each of said enclosures 1, 2 comprises radial fins 12–19 on its cylindrical walls 1a, 1b, 2a, 2b constituting the outside and inside of said toric-shaped casing, said radial fins passing through said walls and extending both inwardly (12, 14, 16, 18) and outwardly (13, 15, 17, 19) of the enclosures 1, 2 into said low-pressure free space and said high-pressure free space of said enclosures 1, 2, the outer parts of the fins being cooled in free convection by the ambient air while the inner parts of the fins constitute, in the low-pressure enclosure 2, the trickling surfaces of the absorber 14, 18 and, in the high-pressure enclosure 1, the condensation surfaces 12, 16.

19. Installation according to claim 5, comprising a cooler of the solution poor in refrigerant (Sp), formed by finned tubes 20 placed outside said two enclosures 1, 2, and a cooler of a rich solution (Sr) formed by radial fins 21, 22 traversing the bottom 2d of said low-pressure enclosure 2.

20. Installation according to claim 1, comprising a cooler of the solution poor in refrigerant (Sp), formed by finned tubes 20 placed outside said two enclosures 1, 2, and a cooler of a rich solution (Sr) formed by radial fins 21, 22 traversing the bottom 2d of said low-pressure enclosure 2.

* * * * *